United States Patent [19]

Böttger

[11] Patent Number: 4,605,467

[45] Date of Patent: Aug. 12, 1986

[54] APPARATUS FOR PRODUCING STEAM HARDENED PRESSEDBOARD

[75] Inventor: Friedrich Böttger, Haan, Fed. Rep. of Germany

[73] Assignee: G. Siempelkamp GmbH & Co., Krefeld, Fed. Rep. of Germany

[21] Appl. No.: 717,715

[22] Filed: Mar. 29, 1985

[30] Foreign Application Priority Data

Mar. 29, 1984 [DE] Fed. Rep. of Germany ....... 3411590

[51] Int. Cl.[4] .............................................. B32B 31/26

[52] U.S. Cl. .................................. 156/497; 156/62.2; 156/62.6; 156/62.8; 156/382; 156/499; 156/583.5; 144/271; 264/109; 425/73; 425/74; 425/445; 425/446

[58] Field of Search .................... 156/62.2, 62.6, 62.8, 156/276, 284, 381, 382, 497, 499, 583.5; 264/109, 123; 144/271; 425/73, 74, 75, 445, 446

[56] References Cited

U.S. PATENT DOCUMENTS

| | | | |
|---|---|---|---|
| 2,282,230 | 5/1942 | MacAlpine | 264/109 |
| 2,430,868 | 11/1947 | Francis | 156/583.5 |
| 3,193,406 | 7/1965 | Mittelman | 156/497 |
| 3,230,287 | 1/1966 | Caron et al. | 264/109 |
| 4,311,550 | 1/1982 | Kerttula | 156/583.5 |
| 4,326,844 | 4/1982 | Kissell | 264/109 |

FOREIGN PATENT DOCUMENTS 2058820 5/1972 Fed. Rep. of Germany .

*Primary Examiner*—Caleb Weston
*Attorney, Agent, or Firm*—Karl F. Ross; Herbert Dubno

[57] ABSTRACT

An apparatus for pressing and steam curing a wood-particle mat to produce a wood-particle board includes a pair of pressing belts which are arranged above each other at a distance to define a gap therebetween within which the wood-particle mat is conveyed and shaped. Along its passage through the pressing belts, the wood-particle mat is first moved along a compression zone in which the gap is gradually reduced and then passes along a sizing zone. Cooperating with the pressing is a steam injection unit which includes a steam supply channel system and a steam discharge channel system. Both channel systems border on the pressing gap and are provided with nozzle bores extending towards the gap. Via the supply channel system, steam is injected along the compression zone in direction of the wood-particle mat while the discharge channel system which extends at least along a downstream section of the sizing zone is provided to collect and eventually to discharge steam.

9 Claims, 4 Drawing Figures

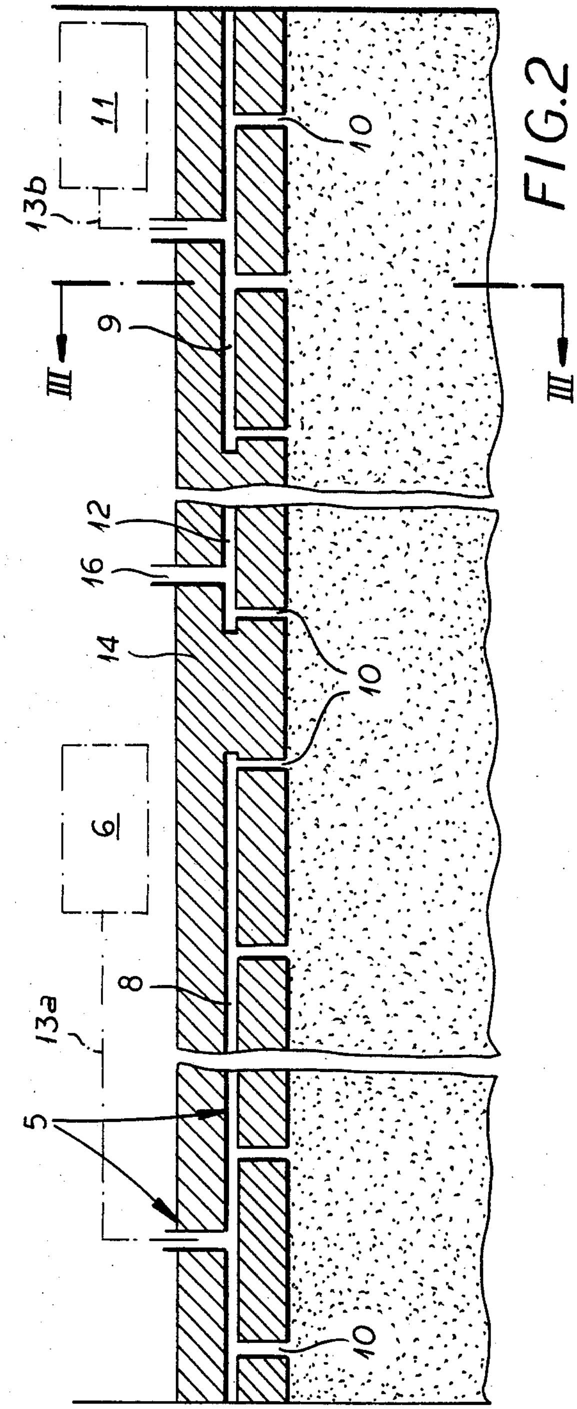
FIG.2
FIG.3
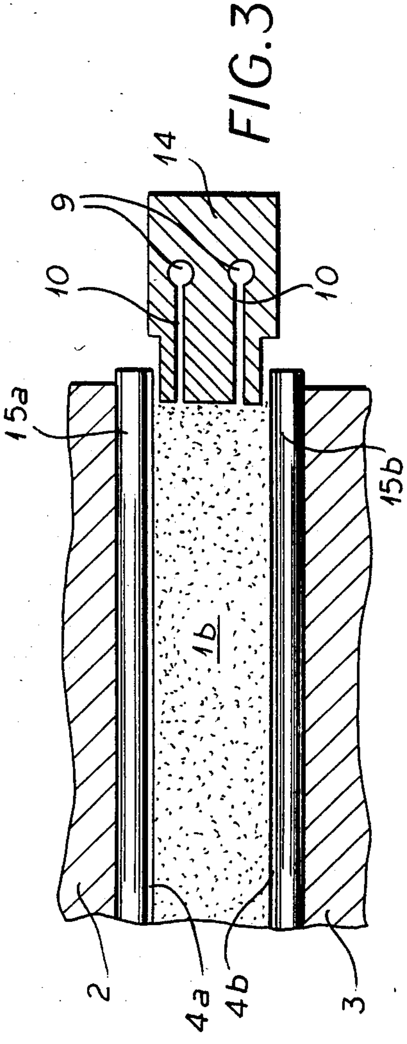

APPARATUS FOR PRODUCING STEAM HARDENED PRESSEDBOARD

FIELD OF THE INVENTION

My present invention refers to an apparatus for producing a pressedboard by pressing and steam curing a mat of wood particles (fibers, sawdust, chips), and in particular is concerned with the production of chipboard, fiber board and the like.

BACKGROUND OF THE INVENTION

For the production of pressedboards, a continuous press can be used. Such a press can include two pressing belts arranged one above the other to provide a gap therebetween along which a continuously deposited and coherent wood-particle mat is guided.

The mat can include intrinsic wood binders such as lignin or thermosetting binders added to the wood particles, e.g. phenolic melamine, formaldehyde or resorcinol resins, and depending upon the degree of compression, the pressedboard can have a range of densities so that the pressedboard product can be used for structural, decorative, insulating or other purposes.

The path between the superposed belts is divided into a compression zone and into a sizing or calibrating zone so as to form a pressedboard of predetermeined dimensions which can then be cut to standard size chipboard, fiber board and the like of smaller size.

During its path through the gap, the wood-particle mat can be treated with steam supplied by a vaporization unit (e.g. a boiler) which injects the water vapor into the gap and through the particle mat.

Such a press is known from the German patent document-open application No. DE-OS 20 58 820. The injection of steam is effected in this system through the conveyor or press belts. Accordingly, the beams or press plates which support the pressing belts are provided with a channel or distribution system for the steam which includes a plurality of nozzles extending perpendicularly to the plane of the belts.

Such a construction is complicated and expensive and does not allow effective steam injection when the pressing belts are supported by the struts via intermediate rollers since the latter must be operated in a steam atmosphere, i.e. as if in a steam boiler. Therefore, specially sealing measures such as infeed and outfeed gates are required for the rollers. For this reason, the aforementioned system has not been used in practice. Moreover, this system does not consider the drying of the particle board after steam injection or the cooling of the finished board.

OBJECT OF THE INVENTION

It is the principal object of my invention to provide an improved apparatus for pressing and steam curing a wood-particle mat to produce a particle board which obviates the aforestated drawbacks.

SUMMARY OF THE INVENTION

I realize this object, according to the invention, by providing a steam injection unit which includes a supply channel system and a discharge channel system extending at each side of the pressing belts and laterally bordering the pressing gap. Via the supply channel system, steam is injected within the compression zone in the mat plane, i.e. along the side of the passing mat via passages lying parallel to this plane while the discharge channel system which extends at least along a downstream portion of the calibrating zone collects and eventually discharges steam. The discharge channel system is connected to a vaccum source to provide the requiste negative pressure and includes nozzle bores extending toward the pressing gap. Likewise, the supply channel system is provided with nozzle bores extending toward the pressing gap.

According to a preferred emboidment of my present invention, a further channel system is arranged between the supply channels in the compression zone and the discharge channels in the calibration zone for allowing a ventilation and drying of the passing wood-particle mat. This further channel system also borders on the pressing gap and is provided with nozzle bores extending toward the gap.

The present invention is based upon the surprising discovery that the steam application does not have to be across the mat along its broad sides but that the steam can be effectively injected into its longitudinal edges as long as the mat is not too compressed and the wood particle mat does not have an extreme width transverse to the foward direction. These conditions are, however, met for most pressedboards. In addition, pressed or particle composites can also be produced which have a beam-like structure with a thickness (or height) which is relatively large in comparison to its width, according to the invention. A width of up to say 3 meters can effectively use the invention.

According to a further feature of my invention, the two supply channels at opposite sides of the gap may be simultaneously used for injecting steam into the passing wood-particle mat. It is, however, also possible to have at least one of these supply channel systems alternatingly switched over a limited zone from steam supply to steam discharge.

Preferably, all the channel systems at each side of the pressing belts are accommodated in a uniform girder or beam which is provided as a spacer defining the thickness of the board. In this case, the apparatus of the invention, i.e. the continuous press is not pressure dependent but is operated in dependence on the path.

BRIEF DESCRIPTION OF THE DRAWING

The above and other objects, features and advantages of my present invention will become more readily apparent from the following description, reference being made to the accompanying drawing in which:

FIG. 2 is a sectional view of the apparatus of FIG. 1 taken along line II—II in FIG. 1;

FIG. 3 is a cross sectional view taken along line III—III of FIG. 1 on an enlarged scale in comparison to FIG. 2.

SPECIFIC DESCRIPTION

Figure 1:
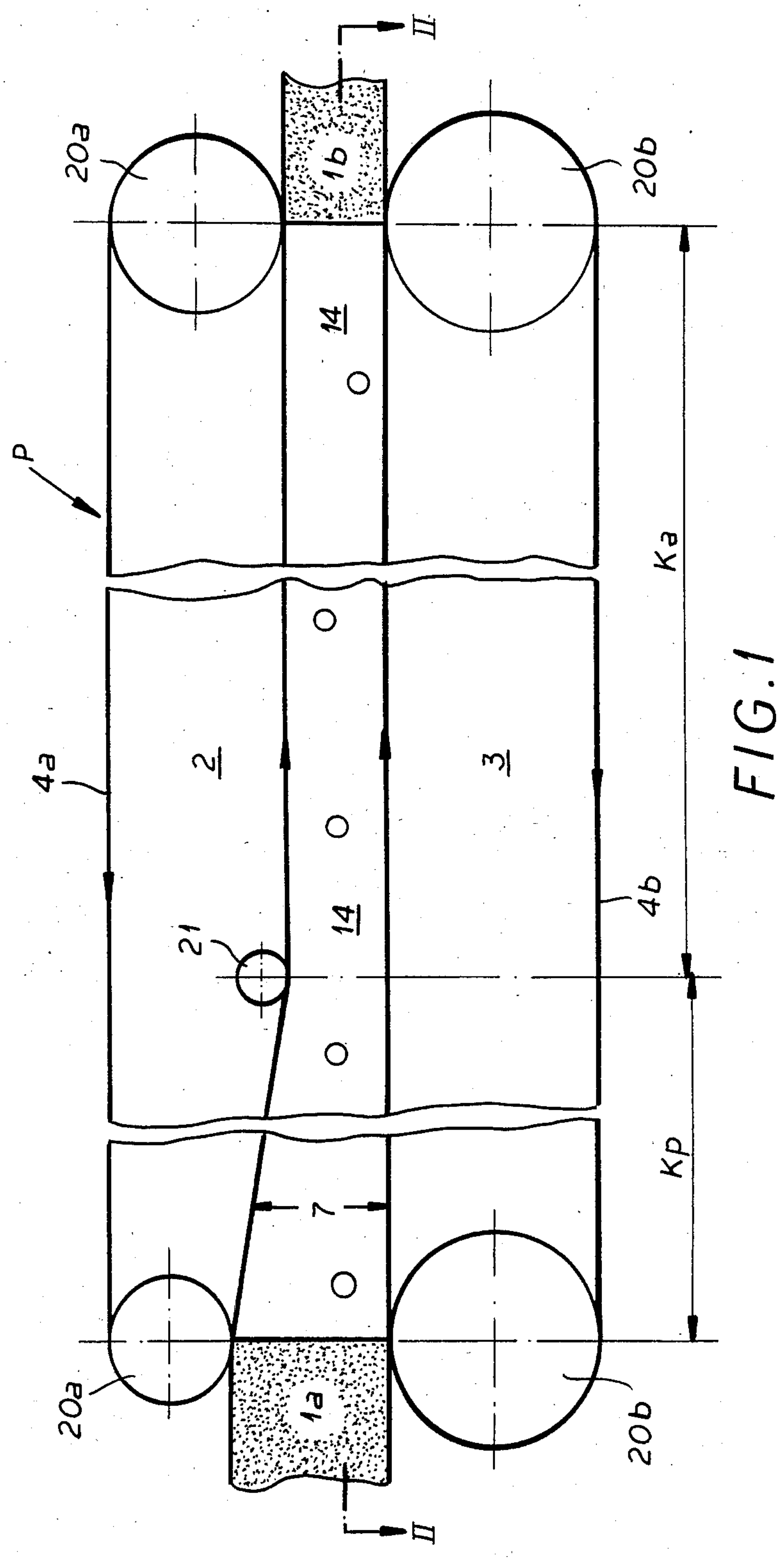
FIG. 1 is a schematic side view of an apparatus according to the invention.

FIG. 1 shows an apparatus for the production of a wood particle board **1*b* by pressing and steam curing or hardening a wood particle mat 1*a***.

The apparatus includes a press P having an upper portion (beam or plate) 2 and a lower portion 3 arranged above each other. The upper press portion 2 has an endless pressing conveyor belt **4*a* which is guided around two drums 20*a* and in the pressing region rides on a series of rollers 15*a* (FIG. 3**).

The lower run or pass of the pressing belt 4a is deflected by an idler roller 21 so as to be sloped upwardly toward the adjacent drum 20a.

The lower press portion 3 includes an endless pressing conveyor belt 4b which is guided around drums 20b and rides on rollers 15b (FIG. 3). The upper stretch of belt 4b essentially lies in a horizontal plane. A drive mechanism which for reasons of simplicity has not been shown is connected to the conveyor belts 4a, 4b to drive the latter. In addition, the press P is connected to a heating unit which, however, does not form part of the invention and is thus also not shown in detail. The heating means can electrically or steam heat the beams 2 and 3.

As can be seen from FIG. 1, the lower run of belt 4a extends with a spacing from the upper run of belt 4b so as to define a gap 7 therebetween which at an upstream section decreases towards the idler roller 21 to provide a compression zone Kp and remains constant in a dowstream section behind the roller 21 to provide a calibration zone Ka. Thus, when being fed into the press P, the wood particle mat 1a is at first pressed along the compression zone Kp through the gradually decreasing gap 7 and is calibrated during its passage through the sizing zone Ka until being discharged as wood-particle board of requested dimension.

Turning now to FIGS. 2 and 3, it may be seen that a continuous or unitary bar 14 extends laterally along the gap 7 at each side of the pressing belts 4a, 4b. The bar 14 is provided as a spacer which determines the width of gap 7 along the compression zone Kp as well as along the sizing zone Ka. Accommodated within the grider 14 is a vapor or steam injection unit 5 which includes a channel system 8 for distributing the steam and a channel system 9 for collecting and discharging the water vapor. Consequently, a respective channel system 8, 9 borders on and extends along each side of the pressing belts 4a, 4b.

During operation of the apparatus, steam may be supplied through both channel systems 8 (at each side of the pressing belts 4a, 4b). It is , however, also possible to supply steam only through one of the channel systems 8 while the other one is—at least along a porton thereof—switched for steam discharge. In the latter case, the connection between the steam generator 6 and the channel systems 8 need only be respectively controlled and can be done by simple switching measures (see FIG. 4).

The channel system 8 communicates with a steam generator 6 via line 13a and is provided with a plurality of nozzle bores 10 opening towards the gap 7 to release steam onto the passing wood particle mat 1a during the compression zone Kp. Extending at least along a downstream section of the sizing zone Ka is the channel system 9 which is provided with a plurality of nozzle bores 10 opening towards the wood particle mat 1a. Via a line 13b, the channel system 9 communicates with a vacuum source 11 which provides the required negative pressure within the channel system 9.

From FIG. 3, it can be seen that two channel systems 9 are arranged one above the other so that each pressing belt 4a, 4b is associated with one channel system 9. Likewise, two channel systems 8 are provided above each other to be associated with each pressing belt 4a, 4b along the compression zone Kp.

Between the channel system 8 and the channel system 9, the girder 14 further accommodates a third channel system 12 which vents steam to the atmosphere and includes several nozzle bores 10 whose opening is also directed towards the gap 7. The channel system 12 is connected to the ambient air via respective ducts 16 and valves not shown. The channel system 8 can be supplied with supperheated steam or with saturated steam.

During operation of the apparatus, steam is thus directed onto the wood particle mat 1a along its longitudinal edges, i.e. from aside while passing the compression zone Kp.

Figure 4:
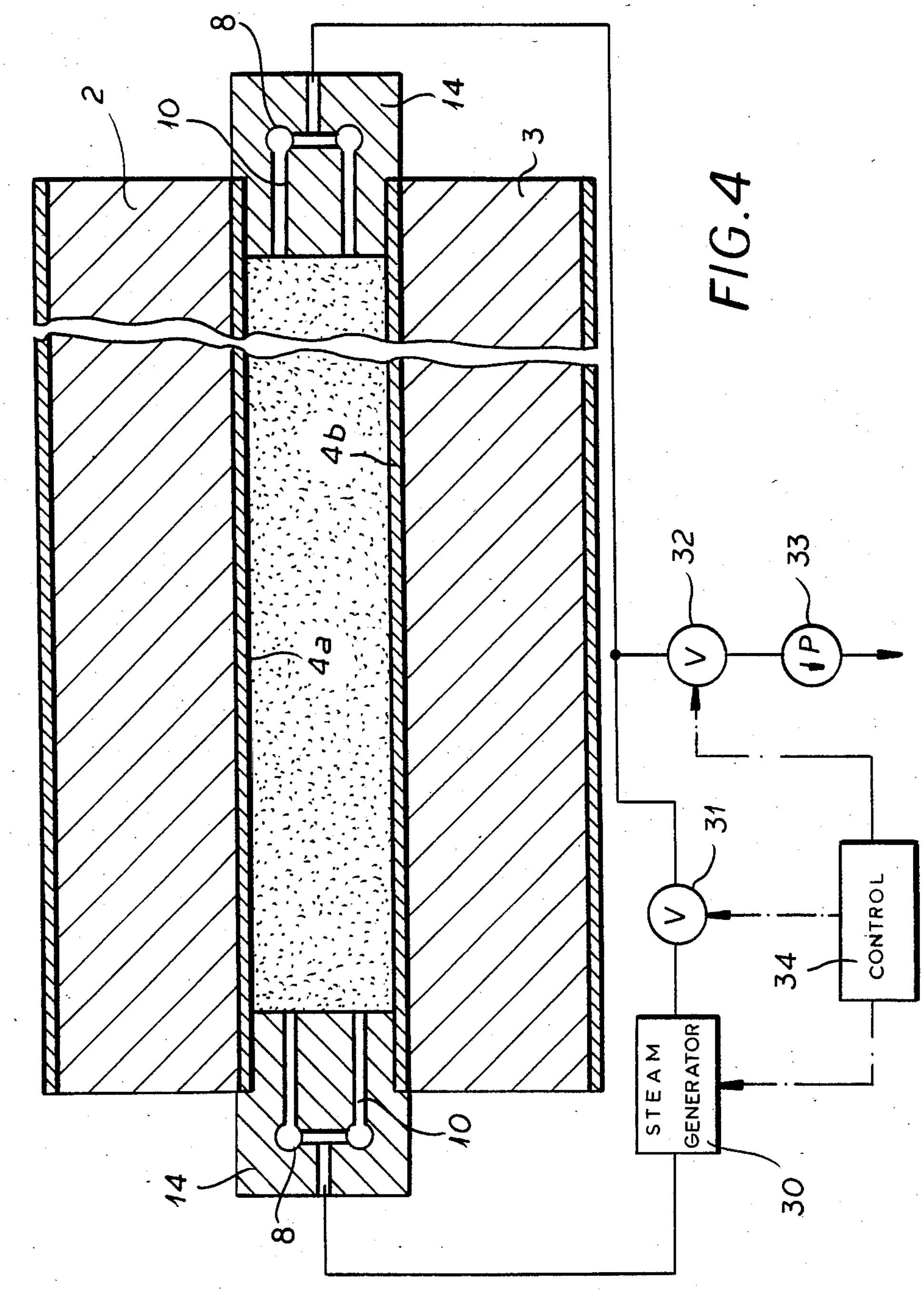
FIG. 4 is a section through a similar press.

As can be seen from FIG. 4, the superheated steam generated at 30 is continuously supplied to the left-hand distribution system 8 but is fed to the right-hand distribution system via a valve 31 operated by the controller reciprocally with a valve 32 connecting the suction pump 33 to this distribution system. The control 34 can also regulate the outward pressure of the steam generator for the particular product desired.

I claim:

1. An apparatus for pressing and steam curing a wood-particle mat to produce a wood-particle board, comprising:

a pair of pressing belts for moving the wood-particle mat along a predetermined path, said belts being arranged with a spacing to define a pressing gap therebetween such that a compression zone and a sizing zone are provided in succession along said path; and steam injection means extending laterally along each side of said path and including a first channel system bordering said pressing gap along said compression zone for injecting steam into the mat and a second channel system bordering said pressing gap at least along a section of said sizing zone for collecting and discharging steam.

2. An apparatus as defined in claim 1, further comprising a vacuum source, said second channel system being connected to said vacuum source.

3. An apparatus as defined in claim 1, further comprising a third channel system for ventilating the passing wood-particle mat, said third channel system bordering on said gap and lying between said first channel system and said second channel system.

4. An apparatus as defined in claim 3 wherein each of said first, second and third channel systems is provided with nozzle bore extending toward said pressing gap.

5. An apparatus as defined in claim 1 wherein said first channel systems respectively arranged at each side of said pressing belts are provided to simultaneously supply steam onto the passing wood particle mat.

6. An apparatus as defined in claim 1 wherein at least one of said first channel systems is alternatively switchable from steam supply to steam discharge at least along a portion thereof.

7. An apparatus as defined in claim 3 wherein said steam injection means further includes a unitary beam extending along each side of said pressing belts and accommodating said first and second channel systems.

8. An apparatus as defined in claim 7 wherein said beam further accommodates said third channel system.

9. An apparatus as defined in claim 7 wherein said beam is provided as a spacer between said belts.

* * * * *